United States Patent [19]
Miura et al.

[11] Patent Number: 5,136,849
[45] Date of Patent: Aug. 11, 1992

[54] SNOW COMPOSITION AND METHOD FOR MAKING ARTIFICIAL SNOW

[75] Inventors: Yuichiro Miura, sapporo; Kazuo Hirano, Tokyo; Takayuki Nate, Yokohama; Taiji Kambayashi, Yamatotakada; Masahisa Ohtsuka, Ohizumimachi; Toshitake Nagai, Ojimamachi, all of Japan

[73] Assignees: Miura Dolphins Co., Ltd.; Tonen Corporation, both of Tokyo; Osaka Organic Chemical Industry Co., Ltd., Osaka; Tonen Chemical Corp., Tokyo; Sanyo Electric Co., Ltd., Moriguchi, all of Japan

[21] Appl. No.: 648,185

[22] Filed: Jan. 31, 1991

[30] Foreign Application Priority Data

Feb. 2, 1990 [JP] Japan ..................... 2-24067
Feb. 2, 1990 [JP] Japan ..................... 2-24068

[51] Int. Cl.$^5$ .............................. F25C 3/00
[52] U.S. Cl. ............................. 62/1; 62/68; 62/74
[58] Field of Search ........... 62/320, 68, 66, 75, 62/348, 54.1, 1, 74; 428/15; 252/70, 1

[56] References Cited

U.S. PATENT DOCUMENTS 4,742,958  5/1988  Bucceri .
5,073,612  12/1991  Ire et al. ................. 526/240

Primary Examiner—Albert J. Makay
Assistant Examiner—J. Sollecito
Attorney, Agent, or Firm—Ostrolenk, Faber, Gerb & Soffen

[57] ABSTRACT

A snow composition is here provided which comprises of about 100 parts by weight of snow selected from the group comprising of natural snow, artificial snow made by a snow machine, and icy snow made by shattering ice blocks to fragments and about 0.1 to about 10.0 parts by weight of a super absorbent polymer in granule form having an average particle size of about 20 to about 500 μm before water absorption.

A method for making artificial snow is also provided here.

16 Claims, No Drawings

SNOW COMPOSITION AND METHOD FOR MAKING ARTIFICIAL SNOW

FIELD OF THE INVENTION

The instant invention relates to a snow composition and a novel method for making artificial snow, and more particularly to an snow composition consisting of snow and a super absorbent polymer in granule form.

The present invention further relates to a novel method for making an artificial snow suitable for skiing which comprises blending natural snow, artificial snow or icy snow with a super absorbent polymer in granule form and freezing the mixture.

DESCRIPTION OF THE PRIOR ART

(Natural snow)

In the recent years, there have been marked decreases in snowfall and accumulation and as a result, considerable hindrance upon the opening of many ski areas has been occasioned. Furthermore, it is necessary to pack the snow on a slope by a tracksetter several times in order to prepare a well-groomed packed slope for sliding on skis because newly fallen natural snow is too soft and is not suitable for smooth sliding by the; and skis. On the other hand, the snow conditions of a tracksetter-groomed trail is not suitable for ski racing events and the trail has to be groomed by a method comprising of treading the slope underfoot, then spraying water on spread snow, and the like.

The snow conditions of runs prepared by such methods are very susceptible to influences from the outside air temperature and change from compact snow into corn snow with the passage of time. Said change is caused by the fact that sublimation and condensation of water molecules of snow cause a change in the snow granules.

It is not easy for a skier to slide smoothly on skis on a slope covered by corn snow, and thus frequent grooming, for example, braking the crust snow, is indispensable. These attempts still gave poor simulation of natural snow conditions.

(Artificial snow)

In recent years, installation of snow machines has become popular in many ski areas to prolong the overall skiing season. Snow machines fall into two groups consisting mainly of "gun" type or "fan" type machines.

A method for making artificial snow by use of those snow machines comprises atomizing compressed water into a subzero atmosphere to make fine ice particles with the aid of adiabatic expansion of compressed air or cooling air. The artificial snow thus produced contains 10% by weight or more of water, and has a density of about 0.3 to about 0.4 g/cm$^3$ with a mechanical strength of less than about 1 kg/cm$^2$. The slope covered by such artificial snow is still not skiable without being packed. Such artificial snow changes its quality more quickly than natural snow and in certain cases, forms corn snow having an average outer diameter of about 1 to 5 mm in a few days. As mentioned above, corn snow is troublesome to skiers and hence a measure similar to the aforesaid is required to resolve the situation.

International Application No. PCT/AU86/00158 (International Publication No. W086/07373) discloses a method for making artificial snow which comprises mixing water with high absorbent material in granule form which swells upon absorbing water, and exposing thereafter the resulting water swollen material to the air followed by freezing. The snow produced thereby has a density of about 0.4 to about 0.9 g/cm$^3$ with a mechanical strength of about 10 to several 100 kg/cm$^2$. These ranges show that density and mechanical strength of the snow vary widely depending on the conditions of snow being exposed and frozen. Such product has a stiff, fine ice form, i.e. an "Eisbahn" in quality, rather than snow. Therefore, when artificial snow suitable for use to cover ski slopes is made from the water-swellable material alone, addition of a surfactant, regulation of particle sizes and water content, and frequent grooming of slopes are necessary to prevent an excessive agglomeration of frozen particles. Such snow is rated among the most difficult snow to handle for ski hill operators.

Some of the problems associated with natural snow or artificial snow used to cover ski slopes include the following.

(a) Packing procedures are indispensable to prepare well-groomed trails for skiing.

(b) It is not easy to make snow having a desired density and strength, i.e. it is difficult to adjust freely the snow conditions to the one that matches skier's abilities or preferences.

(c) Snow conditions vary widely with the passage of time. Therefore, it is difficult to maintain the snow quality in good condition on skiing slopes for a relatively long period of time.

(d) In early spring, the snow turns into corn snow on slopes which is not suitable for skiing.

SUMMARY OF THE INVENTION

The inventors of the instant application have intensely researched to solve the above-mentioned problems, and as a result, they have found that when specific super absorbent polymer in granule form is blended with natural snow or artificial snow, a snow composition having a desired density or mechanical strength is obtained while the quality preferable for skiing is retained in good condition with the passage of time. As a result of the findings, they have developed an improved method for making an artificial snow preferable for skiers wherein by blending a super absorbent polymer in granule form with snow, followed by freezing the mixture, artificial snow having any desirable qualities for skiers can be produced easily and economically, changes in snow quality with the passage of time can be prevented effectively, and economical maintenance of slopes may be attained.

The method of the preset invention may adjust snow conditions freely in a range, for example from soft to hard, which matches skier's abilities and preferences.

Further, a method for regenerating old snow can be provided.

That is, the first aspect of the present invention is directed to an snow composition comprising of (1) about 100 parts by weight of snow selected from the group consisting of natural snow, artificial snow made by a snow machine, and icy snow made by shattering ice blocks to fragments, and (2) about 0.1 to 10.0 parts by weight of a super absorbent polymer in granule form having an average outer diameter of about 20 to about 500 μm in dry state.

The second aspect of the present invention is directed to a method for making artificial snow with which ski slopes are covered or coated easily depending on skier's preference or abilities and the ski slopes can be maintained economically in good conditions.

The method for making artificial snow of the instant invention which comprises the step of mixing a super absorbent polymer in granule form with water to absorb water within the upper limits of its water absorbability, making a mixture by blending said water-swollen polymer in granule form with snow selected from the group consisting of natural snow, artificial snow made by a snow machine, or icy snow made by shattering ice blocks to fragments, and then freezing said mixture.

DETAILED DESCRIPTION OF THE INVENTION

A super absorbent polymer in granule form used in the present invention includes a starch-polyacrylic acid salt, polyacrylic acid salts obtained by a reverse-phase suspension polymerization in an organic solvent, polyacrylic acid salts obtained by a polymerization in water on standing, vinylalcohol-acrylic acid salt copolymer, saponified isobutylene-maleic anhydride copolymer and the like. Of these polymers and copolymers, polyacrylic acid salts obtained by a reverse-phase suspension polymerization in an organic solvent, vinylalcohol-acrylic acid salt copolymer or saponified isobutylene-maleic anhydride copolymer are the most preferred. These preferred polymers or copolymers are obtained in spherical form.

The reasons why the spherical super absorbent polymer in granule form is preferred in the present invention are as follows:

(a) Spherical polymers are easy to blend homegeneouly with snow.

(b) "ice bridges" among frozen particles are finely and homogeneouly dispersed and not too hard even after freezing.

(c) Spherical polymers exposed to the surface of snow have no adverse effects against good sliding on skis.

The preferable particle size of the super absorbent polymer of the present invention is in a range of about 0.05 mm to about 5 mm after water absorption, with a range of about 20 to about 500 $\mu$m before water absorption to give a homogeneous mixture with snow. When the particle size is less than about 20 $\mu$m, homogeneous mixture with snow is difficult to obtain because the particles are too fine. When the particle size is more than about 500 $\mu$m, the large particles are mixed with snow in a isolated state which is unpreferable.

Deionized water absorbability of the present polymer is in a range of about 30 to 500 times the weight of the dried polymer, preferably about 50 to about 200 times the weight of the dried polymer used. When the water absorbability is less than about 30 times, the amount of the polymer to be blended is increased uneconomically, and when the water absorbability is more than about 500 times, gel-strength after water absorption is impaired, and fragility of the water swollen polymers against pressure is increased unpreferably. Further, in the present invention a super absorbent polymer in granule form which can retain its original granule form and its fluidability even after water absorption without becoming sticky is preferable. An absorbent polymer is also known in the market which becomes sticky and pasty when it absorbs water. Such a paste forms a large block of ice when it is frozen, which block can not provide a good covering for ski slopes without any after treatment such as shattering it to fragments. To avoid the problems, an improved method has been proposed in which the paste formed is atomized before freezing. However, this method consumes too expensive energy to handle the viscous fluid.

In order to keep its granule form and good fluidability of the dried polymer even after water absorption, it is necessary to increase the degree of cure of the polymer with a multi-epoxy or multi-amine group-containing curing agent to such an extent that the water absorbability of the polymer matches the above-mentioned range. When the degree of cure is too high, the water absorbability of the polymer decreases unpreferably.

According to the second aspect of the present invention, a method for making artificial snow is provided which comprises the steps of (a) mixing a super absorbent polymer in granule form with water to absorb water within the upper limits of its water absorbability, (b) making a mixture by blending said water swollen polymer in granule form with snow selected from the group consisting of natural snow, artificial snow made by a snow machine, or icy snow made by shattering ice blocks to fragments, and then (c) freezing said mixture.

According to the method, an artificial snow having a desired density or mechanical strength can be produced.

It is observed under a microscope that when the water swollen super absorbent polymer in granule form of the present invention is frozen, the water is oozed from the inside of the granules and frozen on their surfaces. This may explain the fact that when the water swollen polymer in granule form alone is frozen, an unpreferable hard block of snow is obtained.

The methods for blending the super absorbent polymer in granule form with snow are as follows:

(a) a method comprising blending a super absorbent polymer of the invention holding about 5 to 100 times the weight of the dried polymer of water with snow homogeneously.

(b) a method comprising blending a super absorbent dried polymer with snow in dried state.

The former process is adopted for making snow having a desired density or desired mechanical strength in which said process comprises blending about 0.1 to about 10.0 parts by weight of a super absorbent dried polymer in granule form with about 100 parts of water to absorb water in an amount of about 5 to about 100 times the weight of the dried polymer within the upper limits of about 200 parts by weight of the dried polymer, and then mixing homogeneously.

It is observed under a microscope that when the snow composition is frozen by a latent heat of the snow and cooled air, water inside the polymer granules oozed out of the swollen graneles and frozen on the surfaces of granules, forming "ice bridge" among snow and said granules.

Applicants have found that when the amount of water oozed out of the water swollen granules is properly controlled, i.e. when the number of "ice bridges" is adjusted, artificial snow having a desired density and strength is obtained. That is, by varying parameters such as an average particle size of dried polymer, the ratio of (water absorbed) / (water absorbability of the dried polymer), and parts by weight of water swollen polymer, and the like, the amount of water oozed out of the polymer may be controlled with a result that artificial snow having any desired density or mechanical strength may be obtained. For example when a hard, heavy snow is desired, about 20 to 150 μm of a relatively smaller average size of the dried polymer, about 30 to 80 of a relatively higher ratio of (water absorbed) / (water absorbability of the dried polymer), and about 30 to 200 parts by weight of a relatively higher amount of water swollen polymer granules are used preferably. On the contrary, when a soft aggregate of snow granules is desired, about 150 to 500 μm of a large average size of the dried polymer, about 10 to 50 of a relatively lower ratio of (water absorbed) / (water absorbability of the dried polymer), and about 30 to 200 parts by weight of a relatively lower amount of water swollen polymer granules are used preferably. Further, it has now been found that in order to retain the original snow quality for a relatively long period of time, the water absorption ratio should be less than the maximum water absorbability of the dried polymer. In this case, the water swollen particles still have some water absorbability. There fore, they can further absorb liquid phase water formed by melting snow under the influence of atmospheric temperature, with the result that the ski slope can retain its original good conditions for skiing for a relatively long period of time.

The method consisting of blending said dried polymer in granule form with snow is useful for preventing the degradation of snow quality. In this method, about 0.1 to 10.0 parts by weight of a super absorbent dried polymer in granule form is blended with about 100 parts of snow.

In general, the snow newly prepared by a snow machine is a mixture of about 60 to 90% by weight of ice particles and about 40 to 10% of liquid phase water. Such wet snow is troublesome for beginners or intermediate skiers to slide on skis. When super absorbent dried polymer in granule form is blended into such snow, the wet snow changes into dry powdery snow suitable for sliding on skis for beginners or intermediate skiers.

In early spring when liquid water from melted snow appears, the degradation of snow conditions is prevented effectively by blending a super absorbent dried polymer in granule form with the wet snow.

The amount of a super absorbent dried polymer to 100 parts of snow is in a range of about 0.1 to 10.0 parts by weight, preferably in a range of about 1.0 to 10.0 parts by weight for remarkably wet snow, and a preferable range for slightly wet snow is about 0.1 to 1.0 parts by weight.

Any known methods for mixing the super absorbent polymer granules with snow may be used. Among them, a method has been provided wherein the super absorbent polymer contained in a vessel equipped with a spreading device underneath carried on a maintenance truck are spread through a nozzle attached to said device and mixed with snow at the time of maintenance operation for slopes. In the method, both natural snow and artificial snow may be used.

A gun-type or fan-type snow machine equipped with a device capable of spreading said super absorbent polymer in granule form by the aid of compressed air has been known in which the granules are spread simultaneously with the spreading of artificial snow.

Another blending method has been known in which said method comprises the step of mixing said super absorbent polymer in granule form transferred by the aid of air flow to a snow machine with hot or cold water, and then spread of the water swollen polymer into the air by use of compressed air simultaneously with the spreading artificial snow made by the snow machine to give a snow mixture.

One preferred embodiment of the present invention, a method for making artificial snow is provided in which a water absorption ratio of about 5 to 50 times the weight of the dried polymer is used, with a blending weight ratio of the swollen polymer to artificial snow or icy snow being of about 1:3 to about 1:20 to give a soft aggregate of snow particles.

In another preferred embodiment of the present invention, a method for making artificial snow is provided in which a water absorption ratio of about 30 to 60 times the weight of the dried polymer is used, with a blending weight ratio of the swollen polymer to artificial snow or icy snow being of about 2:1 to about 1:3 to give a hard aggregate of snow particles.

Said embodiment of the present invention is based on the Applicants' findings that when the amount of water oozed out of the granules is properly controlled, artificial snow having a desired density or mechanical strength may be obtained because the water oozed out of the granules forms "ice bridges" among the granules.

According to the present method, the snow quality may retain its original good conditions for skiing for a relatively long period of time because an amount of water absorbed by a polymer in advance is less than its maximum water absorbability and hence the frozen granules can further absorb liquid phase water of melted snow.

In one embodiment of the present invention, a method for making artificial snow is provided which comprises the step of spreading super absorbent polymer in dried or slightly wet state over a covering of artificial snow or icy snow made by shattering ice blocks to fragments, mixing the snow and the polymer by means of a mechanical mixer, and then freezing the resulting mixture.

In another preferred embodiment, a method for making artificial snow is provided which comprises the step of spreading super absorbent polymer in dried state simultaneously with the spreading of artificial snow made by a snow machine.

Dry or slightly wet super absorbent polymer are used for the purpose of preventing deterioration of snow quality.

In general, the snow newly prepared by use of a snow machine is a mixture of about 60 to 90% by weight of ice particles and about 40 to 10% by weight of liquid phase water. Such wet snow is troublesome for beginners or intermediates to slide smoothly on skis. When a super aborbent dried polymer in granule form of the present invention is blended with such snow, the snow turns into dried, powdery snow suitable for beginners or intermediate skiers.

In the early spring, the dried or fairly wet polymer absorbs liquid phase water formed by melting of snow and prevent the deterioration of quality of the snow.

In another preferred embodiment of the instant invention, a method for making artificial snow is provided which comprises the steps of spreading about 1 to 100 kg of super absorbent dried polymer simultaneously with the spreading of about 1 ton of artificial snow made by a snow machine. A preferable amount of the dried polymer to artificial snow is in a range of about 0.1% by weight to about 10% by weight. A range of about 1 to 10% by weight is appropriate for heavily wet snow, whereas a range of about 0.1 to 1.0% by weight is suitable for fairly wet snow to give preferable results.

In another preferred embodiment of the present invention, a method for making artificial snow is provided which comprises the step of mixing a super absorbent polymer in dried granule state transferred by air flow to a snow machine with either hot or cold water on the spot to make swollen granules, and then spreading the swollen granules into the air by the aid of compressed air, simultaneously with the spreading of artificial snow to give a mixture of the water swollen granules with snow made by the snow machine.

Any known methods for mixing an absorbent material in granule form with artificial snow may be applied for the present invention. Among them, a method has been known wherein the absorbent material contained in a vessel equipped with a spreading device underneath thereof carried on a maintenance car are spread over a slope through a nozzle attached to said device and mixed with snow simultaneously with a maintenance operation for slopes. In the method, both natural snow and artificial snow may be utilized for the purpose.

A gun-type or fan-type snow machine equipped with a device capable of spreading an absorbent material in granule form by the aid of compressed air has been known in which the granules are spread and mixed with snow simultaneously with the spreading of artificial snow.

Regeneration of the snow composition of the present invention may be possible, if necessary, in which the regeneration process includes the step of separation of snow, water and soils from the polymer followed by drying the recovered polymer for reuse. Such regeneration process makes the instant invention ecomonical, and at the same time environmentally safe after skiing seasons.

The invention is further illustrated by the following examples which are set forth by way of illustration only and not by way of limitation.

Performance test procedures in the examples are as follows:

Deionized water absorbability

About 0.5 gram of a dried super absorbent polymer in granule form are dispersed in 1000 ml. of deionized water and allowed to stand for about 24 hrs., followed by filtration through a 60-mesh wire net. The water-swollen polymer granules are weighed to determine the weight (W). The weight of dried granules = $W_o$ Absorbabilities (Table 1) are then calculated as follows:

$$\text{Absorbability} = \frac{W}{W_0}$$

Flowability after water absorption

About 1.0 gram of a dried super absorbent polymer are added to about 50 ml. of deionized water to absorb said water completely.

Flowabilities (Table 1) are evaluated visually under gentle vibration and reported as ◯(good) X(poor) or △(fair).

Density of frozen artificial snow

Frozen snow with known volume is weighed and then densities (Table 1) are calculated as grams of frozen snow per volumes ($cm^3$) of said snow. When the snow is hard, the volume calculated by measuring dimensions of a snow cube, made by sawing frozen snow, is used instead.

Strength of frozen artificial snow

Release a disk in a adapter to fall straight on the sample snow. Repeat the procedure by use of a "Kinoshita hardness tester" (trade name), changing the adapter so that the disk sinks to depth of about 7 to 30 mm under the snow. Calculate the strength by use of a conversion table.

EXAMPLE 1

Type of super absorbent polymer

Water swollen super absorbent polymer in granule form having a water content of 50 times the weight of dried polymer was blended with icy snow (about 16 mesh) made by crushing a ice block to fragments in a weight ratio of 33:100, followed by freezing at $-5°$ C. After 16 hrs., the densities and strengths of the snow compositions were measured. Table 1 shows the results.

The most preferable strength of snow is about 1.0 $kg/cm^2$ for beginners, and it reaches a strength of about 10 $kg/cm^2$ for experts on the order of an Olympic racer. When the strength is more than about 10 $kg/cm^2$, the snow is disliked by both beginners and experts and probability of suffering an injury when having a fall is increased.

EXAMPLE 2

Average particle diameter of super absorbent polymer

The same procedure of Example 1 was repeated to give snow compositions except that average particle diameter of the super absorbent polymer in granule form was changed. Table 2 shows the results.

EXAMPLE 3

Water absorbability of super absorbent polymer

The same procedure of Example 1 was repeated to give snow compositions except that water absorbability of the polymer was changed. Table 3 gives the results.

EXAMPLE 4

Weight ratio of water swollen polymer to icy snow

The same procedure of Example 1 was repeated to give snow compositions except that weight ratio of the water swollen polymer to icy snow was changed. The results are shown in Table 4.

EXAMPLE 5

Sliding test on a slope at Teine Ski Area in Hokkaido

An artificial skiing slope (3 meter Width, 15 meter Length, 15 cm Deep) was covered with a homogeneous mixture of about 33 parts by weight of a water swollen super absorbent polymer in granule form (made from "BL-51", trade name) containing water about 50 times the weight of the dried polymer and about 100 parts by weight of natural snow. After standing about 14 hrs. at $-5°$ to $-12°$ C., the density, strength and suitability for sliding were measured. Table 5 gives the results.

EXAMPLE 6

Super absorbent polymer before water absorption

A super absorbent polymer before water absorption was blended with icy snow made by crushing an ice block (about 16 mesh particles) and change of the density as well as the strength with the passage of time was measured after storage at about −1° C. The results are shown in Table 6.

EXAMPLE 7

As one of the super absorbent polymers, an acrylic acid Na salt-acrylic acid copolymer having an average particle size before water absorption of about 100 μm in spherical form was obtained by a reversed phase suspension polymerization in an organic solvent by use of an acrylic copolymer as a dispersant. The super absorbent polymer swollen by water about 50 times the weight of the dried polymer was blended with icy snow in a desired ratio, followed by freezing at about −5° C. and at about −20° C. The densities and strengths of the snow compositions were measured. The relationship between density and strength with blending ratio by weight are as follows:

| Blending ratio (by wt.) of swollen polymer to icy snow (freezing condition) | Density (g/cm³) | Strength (kg/cm²) |
|---|---|---|
| 15:85 (−5° C., 16 hrs.) | 0.417 | 3.0–4.4 |
| 25:75 (−5° C., 16 hrs.) | 0.425 | 5.2–7.2 |
| 35:65 (−5° C., 16 hrs.) | 0.427 | 5.5–8.5 |
| 50:50 (−5° C., 15 hrs.) | 0.435 | 34–44 |
| 0:100 (−5° C., 16 hrs.) | 0.323 | 0.17–0.18 |

TABLE 1

| Super Absorbent Polymer Trade Name | Maker | Type | Water Absorbability (Times) | Particle Size Average (μm) | Flowability after Water Absorption | Density (g/cm³) | Strength (kg/cm³) | state |
|---|---|---|---|---|---|---|---|---|
| PQ-Polymer-BL-100 | Osaka Organic Chemical Ind. Co. | A | 100 | 100 spherical | good | 0.43 | 5.2–7.2 | homogeneous |
| SUMICA GEL S-50 | Sumitomo Chemical Co. | B | 500 | 200 spherical | X poor | 0.42 | 5.6–6.4 | species slightly |
| POLYZ SA-20 | Kao Co. | A | 420 | 50–100 spherical | X poor | 0.41 | 3.3–4.0 | species slightly |
| KI-GEL 201 K | Kuraray Co. | C | 200 | 50–100 spherical | X poor | 0.43 | 3.6–6.2 | species slightly |
| ACALIC CAW | Nihon Shokubai Co. | A | 260 | 150–300 fragments | Δ fair | 0.46 | 7.6–11.0 | species all over |
| None | — | — | — | — | — | 0.32 | 0.2–0.3 | — |

Icy snow: Water-swollen super absorbent resin (weight ratio) = 100:33
A = Polyacrylic acid salt
B = vinylalcohol-acrylic acid salt copolymer
C = isobutylene-maleic anhydride copolymer

TABLE 2

| Super Absorbent Polymer Trade Name PQ-Polymer* | Particle Size Average (μm) | Flowability after Water Absorption | Density (g/cm³) | Strength (kg/cm³) | state |
|---|---|---|---|---|---|
| PL-200 | 10 | X poor | 0.42 | 4.5–7.0 | species all over |
| PL-100 | 25 | good | 0.45 | 7.5–14.0 | homegeneous |
| BL-100 | 100 | good | 0.43 | 5.2–7.2 | homogeneous |
| BL-151 | 300 | good | 0.43 | 3.1–3.3 | homogeneous |
| BL-150 | 1000 | good | 0.40 | 1.8–2.5 | separation of resin from snow |

*Type A made by Osaka Organic Chemical Ind. Co.
Water absorbability = 100 times

TABLE 3

| Super Absorbent Polymer Trade Name PQ-Polymer* | Water Absorbability (Times) | Flowability after Water Absorption | Density (g/cm³) | Strength (kg/cm³) | state |
|---|---|---|---|---|---|
| BL-100 | 100 | good | 0.43 | 5.2–7.2 | homogeneous |
| BM-100 | 230 | Δ fair | 0.44 | 4.5–10.0 | homegeneous |
| BH-100 | 450 | X poor | 0.48 | 6.3–7.2 | species slightly |

*Type A made by Osaka Organic Chemical Ind. Co.

TABLE 4

| Icy Snow (parts by wt.) | Water swollen Super absorbent Polymer (parts by wt.) | Density (g/cm³) | Strength (kg/cm²) | State |
|---|---|---|---|---|
| | (BL-100 50 Times) | | | |
| 100 | 33 | 0.43 | 5.2–7.2 | homogeneous |
| 100 | 54 | 0.43 | 5.5–8.5 | homogeneous |
| 100 | 100 | 0.44 | 34–44 | homogeneous and "Eisbahn" |
| 100 | 200 | 0.49 | 76–100 | homogeneous and "Eisbahn" |
| | (BL-151 50 Times) | | | |

TABLE 4-continued

| Icy Snow (parts by wt.) | Water swollen Super absorbent Polymer (parts by wt.) | Density (g/cm³) | Strength (kg/cm²) | State |
|---|---|---|---|---|
| 100 | 11 | 0.42 | 1.7–2.4 | homogeneous |
| 100 | 33 | 0.43 | 3.1–3.3 | homogeneous |
| 100 | 100 | 0.42 | 3.6–4.4 | homogeneous |
| 100 | 200 | 0.44 | 7.9–11.0 | homogeneous |

TABLE 5

| Snow Composition (Parts by Weight) | Natural Snow/BL-150 (Water 50 times) = 100/33 | Natural Snow |
|---|---|---|
| Density (g/cm³) | 0.45 | 0.33 |
| Strength (kg/cm²) | 7.4 | 2.6 |
| Sliding Time (sec.)* | 4.75 | 5.23 |

*Straight-down sliding time for a 15-meter slope
Density and strength could be increased easily by blending water swollen resin and suitability for sliding could also be improved.

TABLE 6

| Icy snow (Parts by wt.) | BL-151 (Parts by wt.) | Time after Blending | Density (g/cm³) | Strength (kg/cm²) | State |
|---|---|---|---|---|---|
| 100 | 0 | 16 hrs. | 0.32 | 0.2–0.3 | homogeneous |
|  |  | 35 days | 0.38 | 3.0–3.7 | corn snow |
| 100 | 0.5 | 16 hrs. | 0.32 | 0.1–0.3 | homogeneous |
|  |  | 35 days | 0.36 | 1.8–2.6 | homogeneous |
| 100 | 1.0 | 16 hrs. | 0.32 | 0.2–0.3 | homogeneous |
|  |  | 35 days | 0.37 | 2.5–2.8 | homogeneous |

When super absorbent polymer before water absorption was added, an effect to prevent a change with the passage of time was observed.

What is claimed is:

1. A snow composition which comprises
   (1) about 100 parts by weight of snow selected from the group consisting of natural snow, artificial snow made by a snow machine, and icy snow made by shattering ice blocks to fragments and
   (2) about 0.1 to about 10.0 parts by weight of a super absorbent polymer in granule form having an average particle size of about 20 to about 500 μm before water absorption.

2. A snow composition according to claim 1 wherein said super absorbent polymer has a deionized water absorbability of about 30 to about 500 times the weight of the dry polymer.

3. A snow composition according to claim 1 wherein said super absorbent polymer is selected from the group consisting of acrylic acid salt polymers, vinylalcohol-acrylic acid salt copolymers, and saponified isobutylene-maleic anhydride copolymers.

4. A snow composition according to claim 1 wherein said super absorbent polymer in granule form contains absorbed water of about 5 to about 100 times the weight of the dry polymer.

5. A snow composition according to claim 1 wherein said super absorbent polymer does not contain absorbed water.

6. A snow composition according to claim 1 wherein said super absorbent polymer in granule form is spherical.

7. A snow composition according to claim 1 wherein said super absorbent polymer has an average particle size of about 0.05 to about 5 mm after water absorption.

8. A snow composition according to claim 2 wherein said super absorbent polymer has a deionized water absorbability of about 50 to about 200 times the weight of the dry polymer.

9. A snow composition according to claim 4 wherein said super absorbent polymer has a deionized water absorbability of about 200 times the weight of the dry polymer.

10. A method for making artificial snow comprising the steps of
   (a) spreading a dried or partly wet super absorbent polymer in granule form having an average particle size of about 20 to about 500 μm before water absorption onto a snow covering made from snow selected from the group consisting of natural snow, artificial snow made by a snow machine, and icy snow made by shattering ice blocks to fragments,
   (b) making a mixture by blending the polymer with snow in a mixer, and then
   (c) freezing said mixture.

11. A method for making artificial snow according to claim 10 wherein said spreading of dried super absorbent polymer in granule form is done simultaneously with making artificial snow in a snow machine.

12. A method for making artificial snow according to claim 10 wherein said spreading uses about 1 to about 100 kg of said dried super absorbent polymer in granule form per about 1 ton of artificial snow made by a snow machine.

13. A method for making artificial snow according to claim 10 wherein said super absorbent polymer in granule form is mixed with either hot or cold water, simultaneously with the spreading of snow made by a snow machine.

14. A method for making artifical snow comprising the steps of:
   (a) mixing a super absorbent polymer in granule form having an average particle size of about 20 to about 500 μm before water absorption with water to absorb less water than its upper limit of water absorbability,
   (b) making a mixture by blending said water swollen super absorbent polymer in granule form with snow selected from the group consisting of natural snow, artificial snow made by a snow machine, and icy snow made by shattering ice blocks to fragments, and then
   (c) freezing said mixture.

15. A method for making artificial snow according to claim 14 wherein said super absorbent polymer has a water absorption ratio by weight of about 5 to about 50 times the weight of the dry polymer, and the blending ratio of the polymer to artificial snow or icy snow of about 1:about 3 to about 1: about 20, whereby to make a soft snow.

16. A method for making artificial snow according to claim 14 wherein said super absorbent polymer has a water absorption ratio by weight of about 30 to about 60 times the weight of the dried polymer, and the blending ratio of the polymer to aritificial snow or icy snow is about 2: about 1 to about 1: about 3, to make hard snow.

* * * * *